United States Patent
Bhaskaran et al.

[19]

[11] Patent Number: 6,064,764
[45] Date of Patent: May 16, 2000

[54] FRAGILE WATERMARKS FOR DETECTING TAMPERING IN IMAGES

[75] Inventors: Vasudev Bhaskaran, Mountain View; Viresh Ratnakar, Sunnyvale, both of Calif.

[73] Assignee: Seiko Epson Corporation, Tokyo, Japan

[21] Appl. No.: 09/052,041

[22] Filed: Mar. 30, 1998

[51] Int. Cl.[7] .................................................. G06K 9/00
[52] U.S. Cl. .......................................... 382/183; 382/100
[58] Field of Search .................................... 382/100, 183, 382/232, 235, 238, 239, 243, 244, 245, 246; 358/426, 261.1, 261.2, 261.3, 427, 261.4, 428, 430, 431, 432; 713/176; 380/54, 10, 232

[56] References Cited

U.S. PATENT DOCUMENTS

| | | |
|---|---|---|
| 5,488,664 | 1/1996 | Shamir . |
| 5,530,759 | 6/1996 | Braudaway et al. . |
| 5,568,570 | 10/1996 | Rabbani . |
| 5,606,609 | 2/1997 | Houser et al. . |
| 5,613,004 | 3/1997 | Cooperman et al. . |
| 5,617,119 | 4/1997 | Briggs et al. . |
| 5,664,018 | 9/1997 | Leighton . |
| 5,687,236 | 11/1997 | Moskowitz et al. . |
| 5,689,587 | 11/1997 | Bender et al. . |
| 5,699,427 | 12/1997 | Chow et al. ................................ 380/3 |
| 5,809,139 | 9/1998 | Girod et al. ................................ 380/5 |
| 5,822,436 | 10/1998 | Rhoads ....................................... 380/54 |
| 5,825,892 | 10/1998 | Braudaway et al. ....................... 380/51 |
| 5,848,155 | 12/1998 | Cox .............................................. 380/4 |
| 5,862,217 | 1/1999 | Steinberg et al. . |
| 5,862,218 | 1/1999 | Steinberg . |
| 5,875,249 | 2/1999 | Mintzer et al. ............................ 380/54 |
| 5,915,027 | 6/1999 | Cox et al. ................................... 380/54 |
| 5,930,369 | 7/1999 | Cox et al. ................................... 380/54 |
| 5,942,414 | 8/1999 | Cass et al. ................................. 382/183 |
| 5,960,081 | 9/1999 | Vynne et al. ............................... 380/10 |
| 5,991,426 | 11/1999 | Cox et al. ................................. 382/100 |

OTHER PUBLICATIONS

"A Two–Dimensional Digital Watermark", A.Z. Tirkel, et al. Pag 1–7 Date Sep. 1988.

*Primary Examiner*—Bisan Tadayon
*Assistant Examiner*—Seyed Azarian

[57] ABSTRACT

A watermarking scheme for images which includes techniques for inserting and extracting fragile watermarks in the frequency domain and for determining whether an image so watermarked has been tampered with. Watermark insertion is accomplished by embedding the bits of a digital signature of a hash function of the image in the frequency coefficients of the image. Tamper detection is accomplished generally as follows: the fragile watermark which was embedded during the watermark insertion process is extracted from the image; the hash function of the image is computed as in the insertion process; it is verified using a public key whether the extracted watermark is a valid signature of the hash value. If so, then there is assurance that the image has not been tampered with. Otherwise, there is reason to conclude that the image has been tampered with.

21 Claims, 5 Drawing Sheets

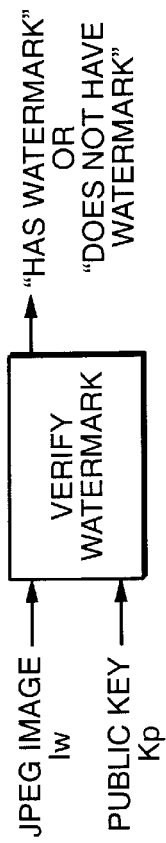
FIG._1
FIG._4
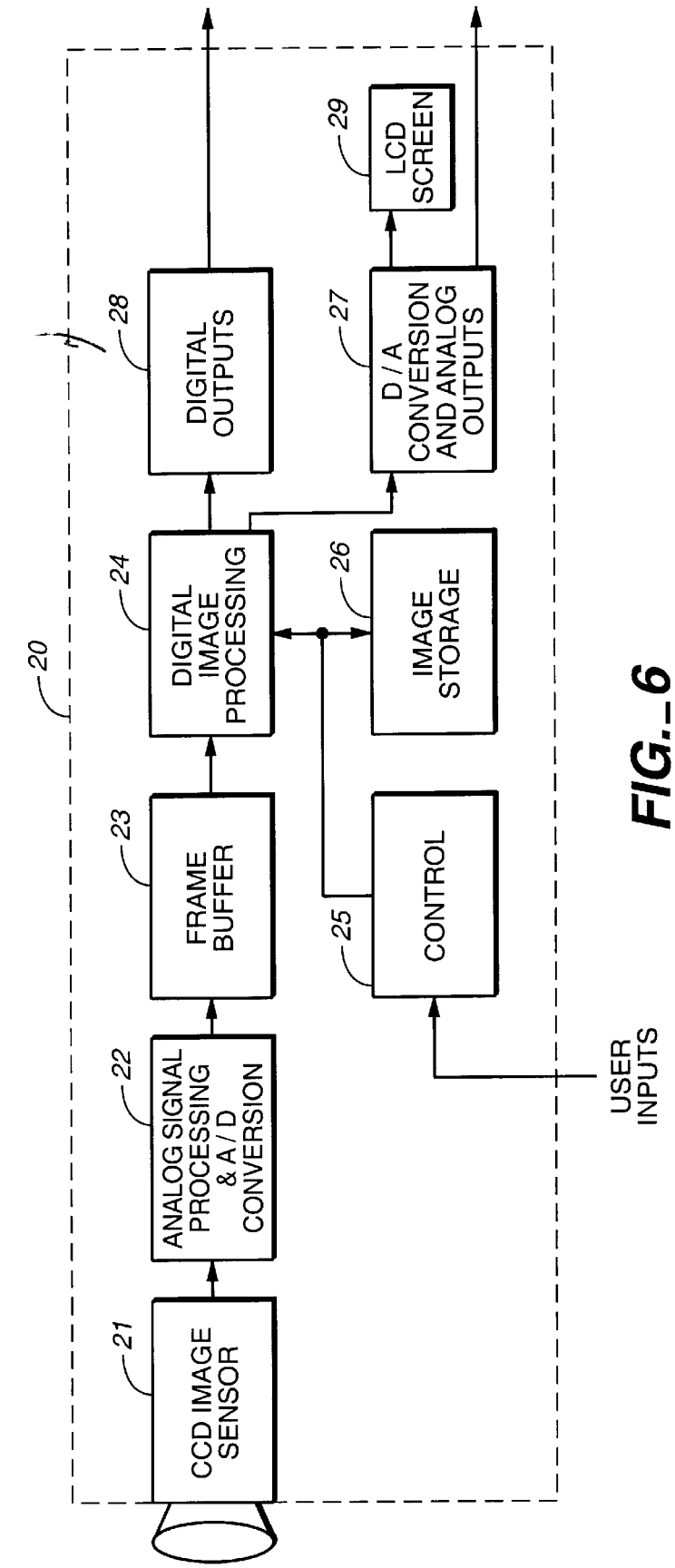
FIG._6

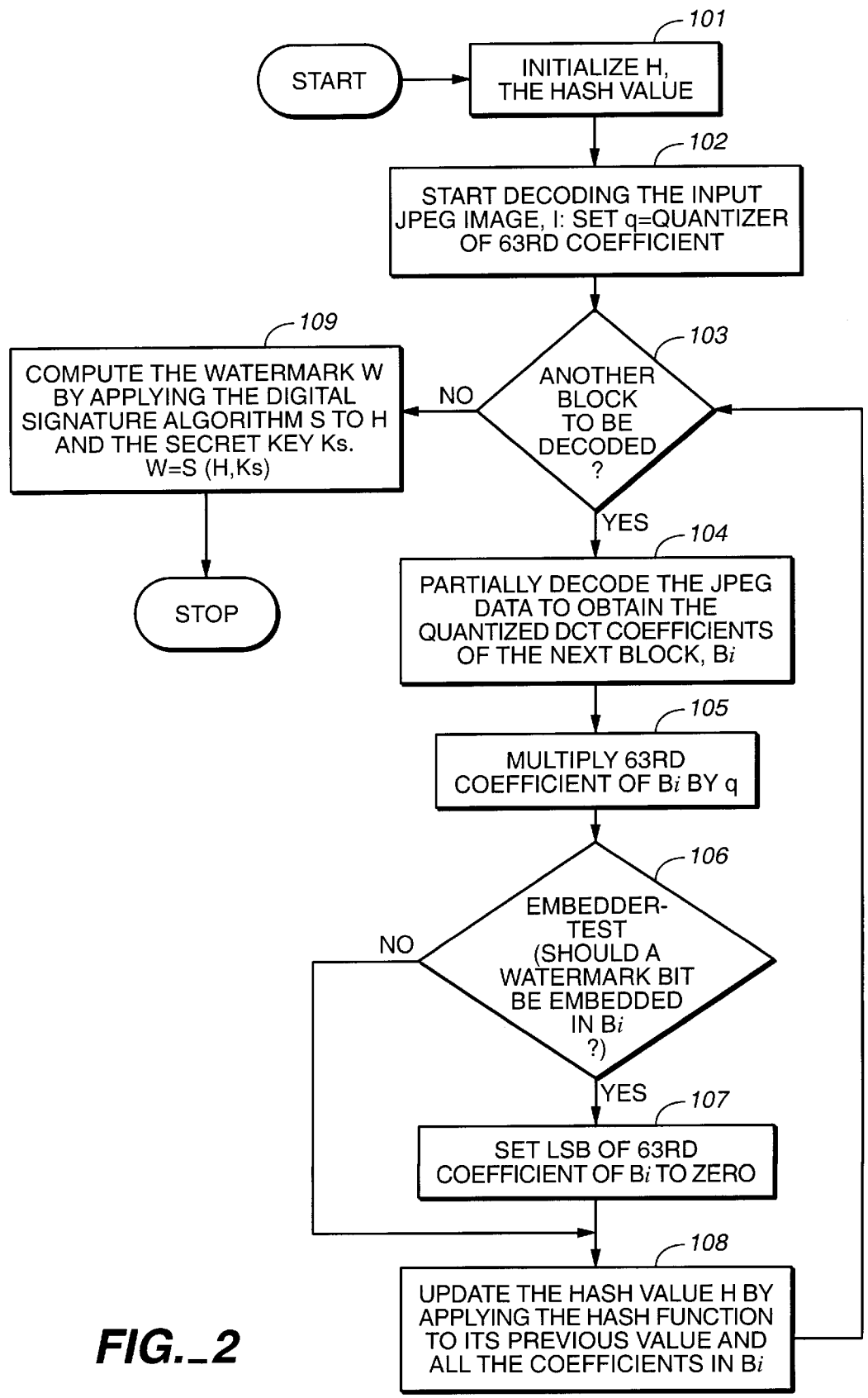
FIG._2

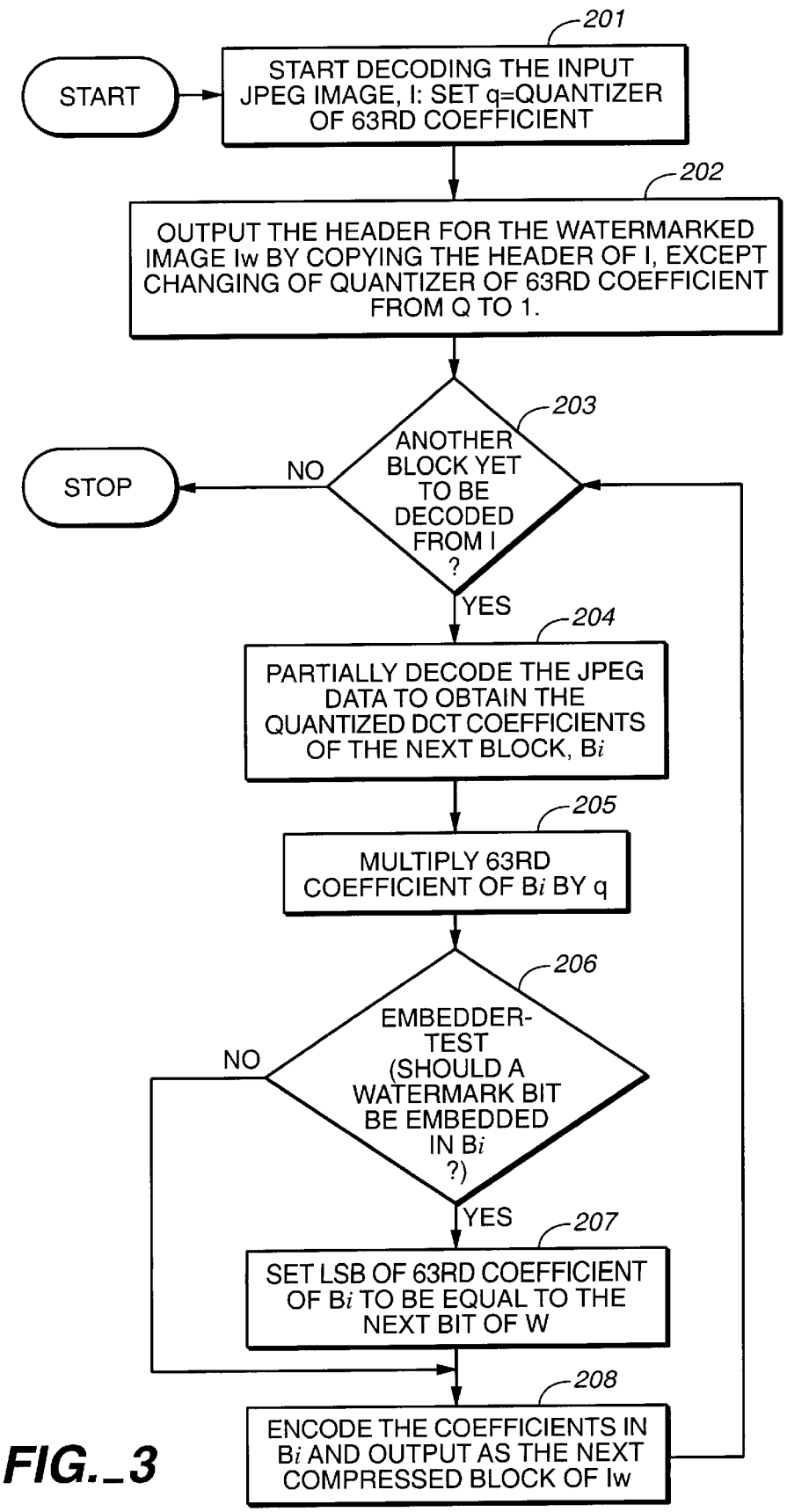
FIG._3

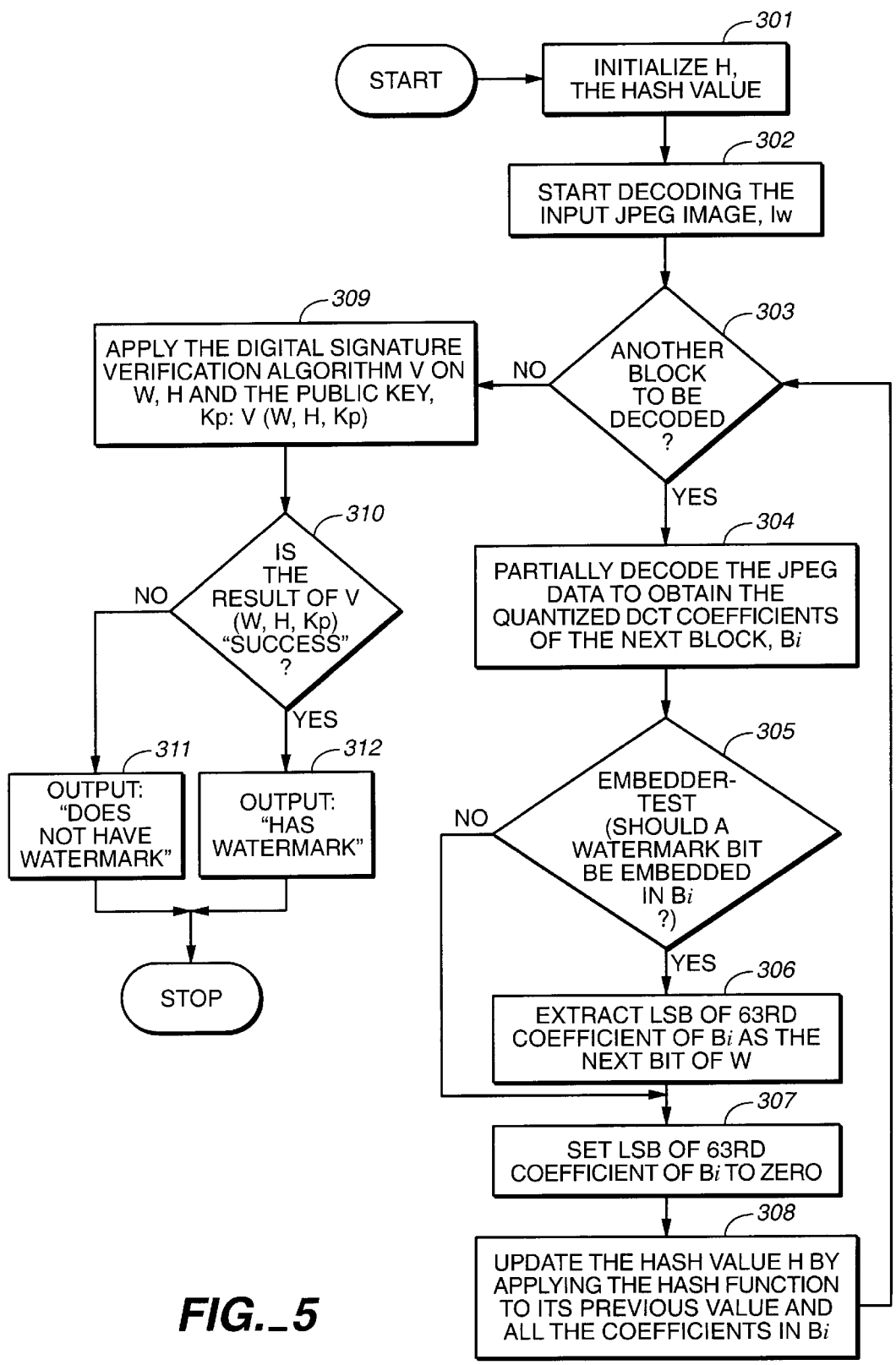
FIG._5

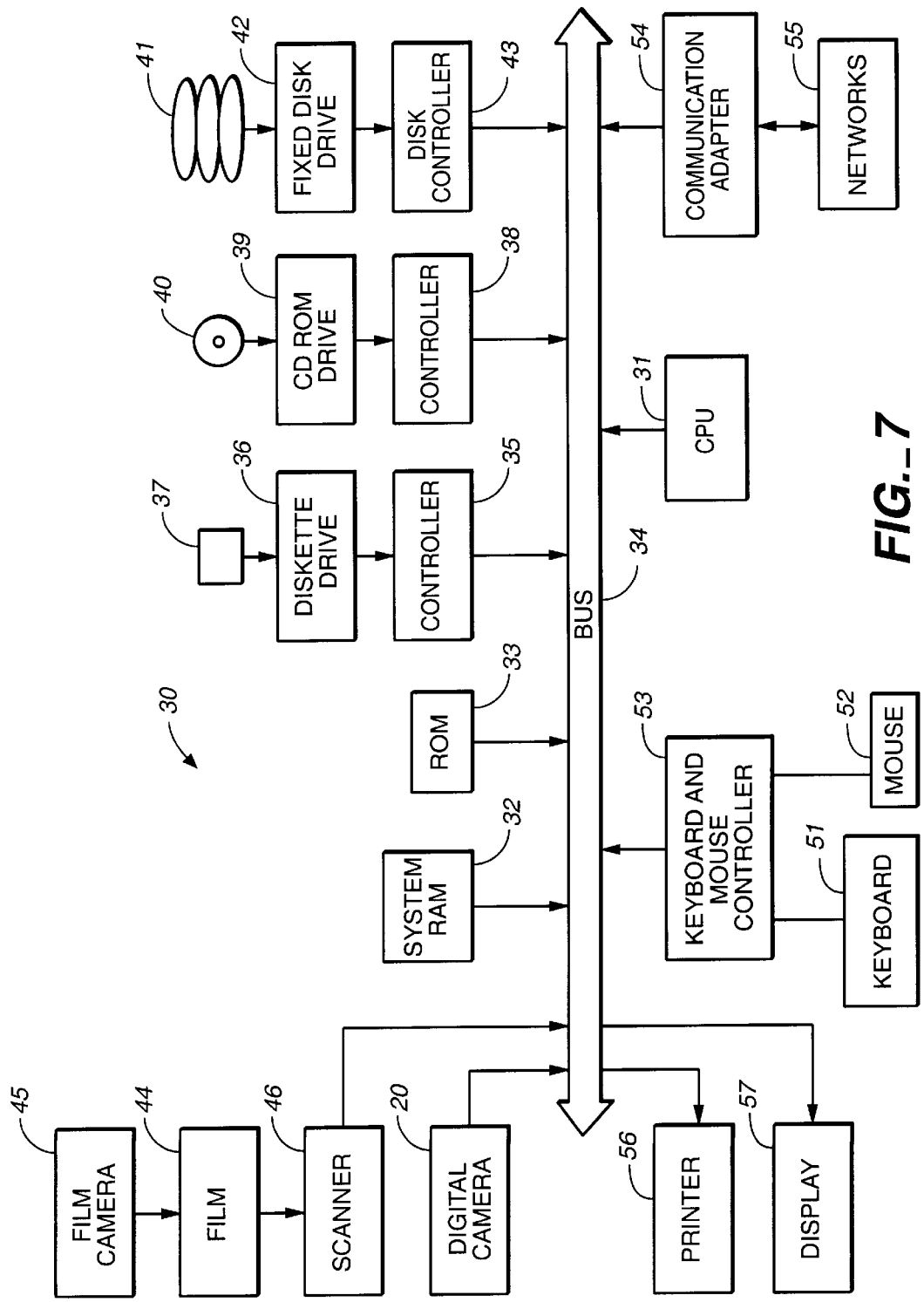
FIG._7

FRAGILE WATERMARKS FOR DETECTING TAMPERING IN IMAGES

BACKGROUND OF THE INVENTION

1. Field of the Invention

This invention relates generally to a fragile watermarking scheme, and more particularly to techniques for inserting and extracting fragile watermarks directly in the frequency domain of a compressed image and for determining whether an image so watermarked has been tampered with.

2. Description of the Related Art

A watermark is a digital pattern inserted into a digital creation, such as a digital image. The process of inserting a watermark into a digital image can be done directly in the frequency domain representation typically used in compressed images. The watermark can be inserted by altering certain frequency coefficients while minimizing the resulting distortion. In case of a block-based frequency domain representation, such as that used in the JPEG image compression standard, frequencies as well as blocks can be chosen to be altered so that the distortion is minimized. In either case, after the watermark has been inserted into the image, a procedure, which may be implemented using certain software, is typically required to validate the watermark.

There are different types of watermarks which serve different purposes. Tamper-resistant watermarks, for example, are designed to identify ownership or the intended recipient of a digital image. To function effectively as an identifier (i.e., to trace unauthorized distribution of an image), a tamper-resistant watermark must be embedded in the image so that it is impossible, or at least difficult, to remove the watermark without visibly damaging the image. Such a watermark must also be resistant to image processing techniques, such as cropping, scaling, image enhancement, compression/decompression, etc. In addition, a tamper-resistant watermark should be readily detectable and recoverable by the proper authorities to permit the tracing and identification of the image, even if someone has tampered with the image.

Another type of watermarks, sometimes referred to as fragile watermarks, are designed to detect tampering of an image. A fragile watermark is embedded in a digital image so that, if someone tampers with the image, that tampering will modify (or destroy) the watermark. Fragile watermarks may be used, for example, in connection with images generated by digital cameras to provide a basis for determining whether or not an image has been tampered with after its creation.

Various watermarking methods have been proposed. For example, U.S. Pat. No. 5,530,759 proposes a digital watermark applied to an original image as a multiplicative correction to pixel sample values of the original image in a linear color space such that the chromaticities of the pixels are not changed. This procedure results in a visible watermark which is simply added to the original image.

U.S. Pat. No. 5,606,609 sets forth an electronic document verification system and method. This refers to a scheme for electronically signing documents, but the signature is not embedded in the document data itself (i.e., the document data is not modified). The signature is just added to the document as another field.

U.S. Pat. Nos. 5,613,004 and 5,687,236 combine steganography (hiding information that is otherwise in plain view) and cryptography (scrambling information that may be sent by unsecured means). Data is watermarked so that if it is copied, it is possible to determine who owns the original. Thus, the watermarking schemes of these patents are of the tamper-resistant type.

U.S. Pat. No. 5,664,018 proposes a watermarking procedure wherein each of a set of copies of a digitized work has a slightly-modified form of a "baseline" watermark that is placed within a critical region of the data. This is a tamper-resistant scheme that makes it difficult to remove the watermark without damaging the content, even if several parties with differently watermarked copies of a single image collude together in an attempt to remove the watermark.

U.S. Pat. No. 5,689,587 sets forth a method and apparatus for hiding data in images. This is a way to hide information in images, again to ensure tamper resistance (copyright type protection).

However, none of these patents provide a fragile watermarking scheme for detecting tampering. Moreover, none of these patents provide a watermarking technique which may be implemented directly in the frequency domain representation of an image such that the distortion resulting from the embedded watermark is minimized. Yet another shortcoming of these patents is that they do not provide insertion and verification procedures that work without having to completely decompress a compressed image.

OBJECTS OF THE INVENTION

Therefore, it is an object of the present invention to overcome the aforementioned problems.

It is another object of the present invention to provide a scheme for inserting and extracting fragile watermarks in frequency domain and for verifying whether an image so watermarked has been tampered with.

It is still another object of the invention to provide a verification procedure in connection with a fragile watermarking scheme for images, whereby, if tampering has occurred, the verification procedure will reveal a damaged watermark and hence provide a basis for declaring that the image has been tampered with.

It is yet another object of the invention to provide a frequency domain watermark insertion and verification process that uses a secret key only in the insertion step while the verification is carried out using a publicly available key.

It is yet another object of the invention to provide a watermark insertion and verification process that does not require full decompression of a compressed image.

SUMMARY OF THE INVENTION

According to one aspect of the invention, a technique for embedding a fragile watermark in a digital image and a technique for detecting tampering of a digital image so watermarked are provided.

Another aspect of the invention involves watermarking a compressed digital image and detecting tampering of a compressed image so watermarked, without having to completely decompress the image.

Yet another aspect of the invention involves an insertion mechanism that uses a secret key while the corresponding verification mechanism uses a publicly available key.

Watermarking the compressed image initially involves computing a hash value for the image which is accomplished by: partially decoding the compressed digital image to generate a plurality of blocks, each block having a plurality of transform coefficients; obtaining a quantizer of the highest frequency coefficient in each block and multiplying that coefficient by its quantizer; determining whether to embed a watermark bit in each block based on the highest frequency transform coefficient in that block and the number of watermark bits remaining to be embedded in the digital image; setting to zero the least significant bit (LSB) of the highest frequency transform coefficient in each block for which it was determined to embed a watermark bit; updating a hash value at each block by applying a hash function at each block, wherein the hash value computed at the last block is a multiple-bit value representative of the entire digital image. Once the hash value for the entire image is computed, a watermark is computed from the computed hash value using a secret key and a digital signature algorithm. Then, each watermark bit is embedded in one of the blocks for which it was previously determined to do so by setting the LSB of the highest frequency transform coefficient in that block to match the corresponding watermark bit.

To determine whether a compressed image so watermarked has been tampered with, the following steps are performed: partially decoding the compressed watermarked image to generate a plurality of blocks, each block having a plurality of transform coefficients; determining each block in which a watermark bit is embedded; extracting, from each block which was previously determined to be an embedder of a watermark bit, the LSB of the highest frequency transform coefficient in that block to generate an extracted watermark; computing a hash value of the digital image by applying a hash function at each block based on the zeroed value of the LSB of the highest frequency transform coefficient in that block, wherein the hash value computed at the last block is a multiple-bit value representative of the entire digital image; applying a digital signature algorithm to the extracted watermark and the computed hash value and a public key to determine whether the compressed watermarked image has been tampered with.

The watermark insertion procedures can be done directly in an image capturing device, such as a digital camera, or can be performed by an appropriately configured computer. Such a computer can also be used to check a watermarked image to determine if tampering has occurred and, if tampering has occurred, to determine where it occurred.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1 is a schematic diagram generally showing the insertion of a watermark into an image in frequency domain in accordance with the invention.

FIG. 2 is a flow diagram depicting an initial scan procedure used in connection with a method of inserting a watermark into an image in frequency domain in accordance with the invention.

FIG. 3 is a flow diagram depicting a procedure to embed bits into an image in connection with a method of inserting a watermark into an image in frequency domain in accordance with the invention.

FIG. 4 is a schematic diagram showing the verification of the existence of the fragile watermark in frequency domain from a watermarked image in accordance with the invention.

FIG. 5 is a flow diagram depicting a method of extracting the watermark from an image and verifying its validity to determine if the image has been tampered with.

FIG. 6 is a block diagram of a digital camera adapted for use in connection with the invention.

FIG. 7 is a block diagram that illustrates the interrelationship between various components that may be used in capturing and viewing digital images, as well as processing such images in accordance with the invention.

DESCRIPTION OF THE PREFERRED EMBODIMENTS

To watermark an image in the frequency domain, the image is scanned once to compute H, which represents a k-bit hash value of the image. Using a digital signature algorithm, S, and a secret key, $K_s$, the m-bit watermark $W=S(H,K_s)$ is computed. A second pass of the image is then made to embed the watermark W into the image. The process is illustrated in FIGS. 1, 2 and 3.

Referring primarily to FIG. 2 and secondarily to FIGS. 1 and 3, in the initial scan procedure, the hash value H is initialized to a fixed value in step 101. The compressed image data, which may be in the form of a JPEG image I, is supplied to a decoder in step 102. The decoder parses the headers from the JPEG data, noting the value of q, the quantization table entry for the highest frequency coefficient, which is the $63^{rd}$ coefficient for the 8×8 discrete cosine transform (DCT) used in JPEG. If there is another block of coefficients yet to be decoded and processed (step 103), the next such block, $B_i$, is partially decoded in step 104. Only the entropy coding of the compressed data is undone, avoiding the de-zig-zagging, dequantization, and inverse discrete cosine transform (IDCT) steps needed for full decompression. This results in a representation of $B_i$ made up of only the non-zero quantized coefficients along with their locations in the zig-zag order. Since we use the $63^{rd}$ coefficient in special ways, the representation of Bi is always made to have the $63^{rd}$ coefficient even when its value is zero. Note that this can be easily done without de-zigzagging the other non-zero quantized coefficients because the $63^{rd}$ coefficient is the last coefficient in the zig-zag order. The decoded representation of the block $B_i$ is then passed to step 105, where the $63^{rd}$ coefficient is multiplied by its quantizer, q (obtained in step 102). The reason for this step is as follows. Small variations in the higher frequencies are invisible to the human eye. The watermark W is embedded bit-by-bit in the image by modifying only the highest frequency coefficient (the $63^{rd}$ coefficient in this case) so as to minimize the distortion. A watermark bit is embedded (later, in step 207, FIG. 3) in a coefficient value by changing the LSB of the value to be equal to the watermark bit. If a quantized $63^{rd}$ coefficient has the value v, then changing its LSB changes the dequantized coefficient by plus or minus q, where q is the quantizer for the $63^{rd}$ coefficient. To minimize this change, we set the quantizer for the $63^{rd}$ coefficient to be 1 and replace the $63^{rd}$ coefficient in every block (not just those embedding watermark bits) directly by their dequantized values (which are obtained by multiplying by q). On decompression, the distortion can only be plus or minus 1, as a result of this step. Since the $63^{rd}$ coefficient is typically zero in most of the blocks, the increase in compressed size resulting from the multiplication in step 105 is minimal, as only the non-zero coefficients account for most of the compressed size.

A decision is made as to whether a watermark bit is to be embedded in block $B_i$ in step 106. The decision procedure for step 106 is designed so as to minimize the resulting distortion in the image as well as to minimize the resulting size-increase of the compressed image. We denote this decision procedure by the name EMBEDDER-TEST, to simplify the subsequent presentation as this decision procedure is used again in two places. EMBEDDER-TEST is fully described as follows.

For color images, watermark bits are embedded only in the luminance plane of the image. This is done so that during decompression, when the luminance-chrominances color representation is converted back to red, green, and blue pixel values (RGB), the resulting distortion is minimized. Moreover, the chrominance planes are typically subsampled, so any distortion in a single chrominance block results in distortions in several RGB blocks. Thus, in grayscale images as well as in color images, watermark bits are embedded only in the color component numbered zero (which is the luminance plane for color images). To minimize the distortion, watermark bits are embedded only in the $63^{rd}$ DCT coefficient, as mentioned previously. To minimize the compressed size, only those blocks are chosen to embed a watermark bit where the 63rd coefficient is already non-zero. This follows from the observation that changing a zero value to a non-zero value results in a far greater increase in compressed size, compared to changing a non-zero value to another nonzero value. However, since EMBEDDER-TEST will also be performed by the watermark verification procedure, we do not choose as embedders even the blocks where the $63^{rd}$ coefficient (dequantized) is plus or minus 1, as it might potentially be turned to zero on embedding the watermark bit, and then the verifier will not be able to decide the block to be an embedder. If, at some point, the number of watermark bits remaining to be embedded becomes equal to the number of blocks remaining in component zero, every subsequent block in component zero is decided upon as an embedder of a watermark bit.

If the decision to embed a bit in block $B_i$ is yes, then the LSB of the $63^{rd}$ DCT coefficient is set to zero in step 107 and the procedure proceeds to step 108. If the decision is no, then the procedure directly proceeds to step 108. The hash value H is updated in step 108 using its previous value, and the values of all the non-zero quantized coefficients in $B_i$ along with their locations in the zig-zag order, using a one-way hash function. The $63^{rd}$ coefficient is always included in this computation even if it is zero.

When all the blocks have been processed, the procedure proceeds to step 109, where the digital signature algorithm S is applied to the computed hash value, H, and the secret key, $K_s$, to compute the m-bit watermark $W=S(H, K_s)$.

Referring primarily to FIG. 3 and secondarily to FIGS. 1 and 2, in the second pass of the watermark insertion procedure, the input JPEG image I is once again fed to a decoder which parses its headers noting the value of q, the quantizer for the $63^{rd}$ coefficient, in step 201. The headers for the watermarked output JPEG image, $I_w$, are produced in step 202 by copying them directly from the input image, except that the quantizer of the $63^{rd}$ coefficient in the quantizer table is changed to be 1 instead of its previous value, q. If there is another block of coefficients yet to be decoded and processed (step 203), the next such block, $B_i$, is partially decoded in step 204. Again, only the entropy coding of the compressed data is undone, avoiding the de-zig-zagging, dequantization, and IDCT steps needed for full decompression. This results in a representation of $B_i$ made up of only the non-zero quantized coefficients (except for the $63^{rd}$ coefficient which is always included in the representation) along with their locations in the zig-zag order. The $63^{rd}$ coefficient of each block is multiplied by the q, in step 205. EMBEDDER-TEST is performed in step 206 to determine whether block $B_i$ is supposed to embed the next bit of W. This determination may be made again on a block-by-block basis or may be made using the results of the previous decision-making process (step 105), if those results are stored in memory. In any case, if block $B_i$ is supposed to embed the next bit of W, then the LSB of the $63^{rd}$ DCT coefficient of $B_i$ is set to match the next bit of W in step 207 and the procedure proceeds to step 208. If the decision in step 206 is "no", then the procedure directly proceeds to step 208. In step 208, the coefficients in $B_i$ are encoded and produced as output into the compressed data stream for the watermarked image, $I_w$. Note that the representation of the quantized coefficients of $B_i$ that we use enables efficient encoding as the quantized coefficients are already in the zig-zag order, thus avoiding the DCT, quantization, and zig-zagging steps generally required for compression. The process repeats until all of the blocks have been processed.

The verification procedure for the frequency domain watermarking method is illustrated in FIGS. 4 and 5 and is used to determine if the image has been tampered with. Referring to FIG. 5, after initializing the hash value H in step 301, the watermark verification procedure begins to decode the input image, $I_w$, parsing its headers, in step 302. In step 303, it is determined whether another block remains to be decoded. If so, the next block, $B_i$, is partially decoded in step 304. Again, only the entropy coding of the compressed data is undone, avoiding the de-zig-zagging, dequantization, and IDCT steps needed for full decompression. This results in a representation of $B_i$ made up of only the non-zero quantized coefficients (except for the $63^{rd}$ coefficient which is always included in the representation) along with their locations in the zig-zag order. EMBEDDER-TEST is performed in step 305 to determine whether block $B_i$ is supposed to embed the next bit of W. If it is, then the LSB of the $63^{rd}$ coefficient of $B_i$ is extracted as the next bit of the watermark W in step 306, and then that LSB is set to zero in step 307. The procedure moves to step 308 from step 307 as well as from step 305 when the block $B_i$ is not a watermark bit embedder. The hash value H is updated in step 308 using its previous value, and the values of all the non-zero quantized coefficients in $B_i$ along with their locations in the zig-zag order, using the one-way hash function. The $63^{rd}$ coefficient is always included in this computation even if it is zero. The process continues through all the blocks and in the end, the extracted watermark W and the hash value H have been fully computed. At this point the digital signature verification algorithm V (corresponding to the signing algorithm S) is applied using the public key $K_p$ (corresponding to the secret key $K_s$) to verify whether or not W is the same as $S(H, K_s)$ in step 309. Note that step 309 does not require the use of the secret key $K_s$. Step 310 examines the output of the digital signature verification algorithm $V(W,H,K_p)$ applied in step 309. If the verification algorithm $V(W,H,K_p)$ is successful, then the image has the fragile watermark intact, and thus has not been tampered with (step 312). If $V(W,H,K_p)$ outputs failure, then the fragile watermark (if it ever existed) has been destroyed, and it may be concluded that the image has been tampered with or never had the fragile watermark corresponding to the key pair $(K_s,K_p)$ (step 311).

The effectiveness of the image tampering detection process depends on the strength of the hash function and the signing and verification algorithms S and V. A variety of one-way hash functions may be used, such as a hash function called MD5 developed by R. Rivest, or the SHA, or RIPEMD hash functions. Similarly, there is considerable choice available for the signature and verification algorithm pair, such as the El Gamal scheme, the DSA algorithm, or the RSA algorithm.

This fragile watermarking procedure can be modified to detect roughly the area of the image in which some tampering has been done. This is accomplished by dividing the image into some number of regions and applying the whole insertion procedure separately on each region. Only the regions that contain tampering will show a damaged watermark. This modification will not, however, detect a restricted form of tampering which is done by forming an image that is a collage of several regions extracted from different images or reordered regions from a single image, each region carrying a valid watermark. Such tampering, however, is likely to be visually obvious, if the regions are large enough.

Similar fragile watermarking techniques can be applied in the spatial domain as well. Instead of the highest-frequency coefficients, all or some of the pixels can be directly used as watermark bit embedders by setting their LSB to zero prior to the hash computation and then setting that LSB to the watermark bit in the second pass. Note that this invention does not suggest intermingling of the spatial and frequency domain watermarking processes. It does not suggest that watermark insertion can be done in the frequency domain as revealed in this invention while the corresponding watermark verification can be done in the spatial-domain as revealed in this invention.

In addition, the watermark can be chosen to be a visible watermark. A visual watermark can be embedded in the frequency domain by computing the transform frequency coefficients of a distinctive watermarking signal, and simply adding the coefficients to those of the image. This process works as a result of linearity of the transforms commonly used in image coding (such as DCT), which ensures that addition in the pixel domain corresponds to addition in the frequency domain. A similar visible watermarking process can be performed in spatial-domain as well.

It should be noted that the block and flow diagrams used to illustrate the watermark insertion, extraction and verification procedures of the present invention, illustrate the performance of certain specified functions and relationships thereof. The boundaries of these functional blocks have been arbitrarily defined herein for the convenience of description. Alternate boundaries may be defined so long as the specified functions and relationships thereof are appropriately formed. Moreover, the flow diagrams do not depict syntax or any particular programming language. Rather, they illustrate the functional information one skilled in the art would require to fabricate circuits or to generate software to perform the processing required. Each of the functions depicted in the block and flow diagrams may be implemented, for example, by software instructions, a functionally equivalent circuit such as a digital signal processor circuit, an application specific integrated circuit (ASIC) or combination thereof.

The watermarking techniques of the present invention may be employed in connection with various devices including a digital camera, a block diagram of which is illustrated in FIG. 6. Operating under microprocessor control, the digital camera 20 has a charge-coupled device (CCD) image sensor that captures an image and converts it to an analog electrical signal in block 21. The analog signal is then processed and digitized in block 22, after which the digital image is temporarily stored in a frame buffer 23 while it undergoes digital processing in block 24. The digital image processing block 24 performs several functions including compression and decompression. Processing block 24 may also perform the watermarking techniques of the present invention using hardware or software. Under user control 25, the processing block 24 interfaces with in-camera image storage 26 where decompressed image data may be stored. The storage block 26 may comprise compact magnetic or solid-state storage media, either removable or fixed within the camera 20, and may include removable, large-capacity PCMCIA-format hard disk cards or flash memory cards.

The camera 20 includes analog and digital outputs, 27 and 28 respectively, through which image data may be transmitted within the camera or to external devices. Uncompressed image data may be transmitted, via the analog outputs 27, to an LCD screen 29 within the camera 20, or to external devices such as a VCR or television receiver. Image data, whether compressed or uncompressed, may also be transmitted through the digital outputs 29 to a digital device such as a computer system where the image could be displayed or where watermarked images could be verified.

FIG. 7 is a block diagram that illustrates the interrelationship between various components that may be used in capturing, processing and viewing digital images. One of the more important components is a computer system, identified generally by reference numeral 30. The computer system 30 may be of any suitable type such as a main frame or personal computer.

Computer system 30 comprises a central processing unit (CPU) 31 which may be a conventional microprocessor, a random access memory (RAM) 32 for temporary storage of information, and a read only memory (ROM) 33 for permanent storage of information. Each of these components is coupled to a bus 34. Operation of the computer system 30 is typically controlled and coordinated by operating system software. The operating system, which is embodied in the system memory and runs on CPU 31, coordinates the operation of computer system 30 by controlling allocation of system resources and performing a variety of tasks, such as processing, memory management, networking and I/O functions, among others.

Also coupled to bus 34 by a controller 35 is a diskette drive 36 into which a non-volatile mass storage device such as a diskette 37 may be inserted. Similarly, a controller 38 interfaces between bus 34 and a compact disc (CD) ROM drive 39 which is adapted to receive a CD ROM 40. A hard disk 41 is provided as part of a fixed disk drive 42 which is coupled to bus 34 by a disk controller 43.

Software for the watermarking techniques may be stored on storage devices 207 and 210 and transferred to CPU 31 for execution. Alternatively, the software may be stored in RAM 32 or ROM 33. Similarly, image data be loaded into and extracted from computer system 30 using removable storage media devices such as the diskette 37 and CD ROM 40.

Image data may be input into computer system 30 in other ways as well. Film-based images 44 generated by a film camera 45 can be digitized by a scanner 46 for storage and processing by the computer 30. The digital camera 20 can directly digitize images and transmit them to the computer 30, as explained above. A keyboard 51 and mouse 52, which are coupled to bus 34 via a controller 53, facilitate the input of such data and otherwise provide a means for entering information into computer system 30.

Image data may also be transferred to and from computer 30 for remote locations. To this end, computer 30 may also include a communications adapter 54 which enables the computer 30 to communicate with networks 55, which may include local area networks (LANs), the internet or online services, via direct connections or via modem.

In accordance with the invention, images that have been previously watermarked, say, in the digital camera 20 may be transmitted to computer 30 for verification. Alternatively, unmarked images may be watermarked and later verified in computer 30 using appropriate hardware or software that is executed by the CPU 31.

Digital images transmitted or stored in computer 30 may be viewed in a number of different ways. A printer 56 attached to computer 30 can produce color prints that vary in quality depending on the printer 56. Another option is to view the images on a display 57 associated with the computer 30. Yet another choice is to display the images on a television monitor using a VCR.

While the invention has been described in conjunction with specific embodiments, it will be evident to those skilled in the art in light of the foregoing description that many further alternatives, modifications and variations are possible. For example, visible watermarking process and the invisible watermarking process described in this invention can be combined depending upon the application. Furthermore, the choice of blocks to be used in the watermarking process can be made application dependent. Thus, the invention described herein is intended to embrace all such alternatives, modifications, applications and variations as may fall within the spirit and scope of the appended claims.

What is claimed is:

1. A method of watermarking a compressed digital image, comprising the steps of:

partially decoding the compressed digital image to generate a plurality of data blocks, each block having a plurality of transform coefficients;

determining whether to embed a watermark bit in each block based on one of the plurality of transform coefficients in that block and a number of watermark bits remaining to be embedded in the digital image;

computing a watermark, having a plurality of bits, for the entire digital image by applying a digital signature algorithm and a secret key; and embedding a watermark bit in each block for which it was determined to do so in said determining step by setting the one of the plurality of transform coefficients in that block to match a corresponding bit of the computed watermark.

2. The method of claim 1, wherein the one of the plurality of transform coefficients in each block is the transform coefficient representative of the highest vertical frequency and highest horizontal frequency in that block.

3. The method of claim 1, wherein said step of computing the watermark further comprises the step of:

setting to zero at least one bit of the one of the plurality of transform coefficients in each block for which it is determined in said determining step to embed a watermark bit.

4. The method of claim 3, further comprising the step of:

encoding the plurality of blocks after said embedding step is completed to re-compress the watermarked image.

5. The method of claim 3, wherein said of computing the watermark further comprises the step of:

updating a hash value at each block by applying a hash function at each block, wherein the hash value computed at a last block is the multiple-bit hash value representative of the entire digital image.

6. The method of claim 5, wherein said step of computing the watermark further comprises the steps of:

obtaining a quantizer of the one of the plurality of transform coefficients in each block; and multiplying the one of the plurality of transform coefficients in each block by its quantizer.

7. A method of watermarking a compressed digital image, comprising the steps of:

computing a watermark, having a plurality of bits, for the entire digital image, comprising the steps of:

partially decoding the compressed digital image to generate a plurality of data blocks, each block having a plurality of transform coefficients;

obtaining a quantizer of the one of the plurality of transform coefficients in each block;

multiplying the one of the plurality of transform coefficients in each block by its quantizer;

determining whether to embed a watermark bit in each block based on one of the plurality of transform coefficients in that block that is representative of a highest vertical frequency and a highest horizontal frequency in that block and a number of watermark bits remaining to be embedded in the digital image;

setting to zero at least one bit of the one of the plurality of transform coefficients in each block for which it is determined in said determining step to embed a watermark bit;

updating a hash value at each block by applying a hash function at each block, wherein the hash value computed at a last block is a multiple-bit hash value representative of the entire digital image; and applying a secret key and a digital signature algorithm to the multiple-bit hash value to compute the watermark; and embedding a watermark bit in each block for which it was determined to do so in said determining step by setting the at least one bit of the one of the plurality of transform coefficients in that block to match a corresponding bit of the computed watermark.

8. A method of detecting tampering of a compressed watermarked image, comprising the steps of:

partially decoding the compressed watermarked image to generate a plurality of data blocks, each block having a plurality of transform coefficients;

determining each block in which a watermark bit is embedded;

extracting, from each block for which it was determined in said determining step to be an embedder of a watermark bit, at least one bit of one of the plurality of transform coefficients in that block to generate an extracted watermark;

computing a hash value of the digital image by applying a hash function at each block based on a zeroed value of the at least one bit of one of the plurality of transform coefficients in that block, wherein the hash value computed at a last block is a multiple-bit value representative of the entire digital image; and applying a digital signature verification algorithm to the extracted watermark and the multiple-bit computed hash value and a public key to determine whether the compressed watermarked image has been tampered with.

9. The method of claim 8, wherein the one of the plurality of transform coefficients in each block is the transform coefficient representative of the highest vertical frequency and highest horizontal frequency in that block.

10. An image capturing device, comprising:

a sensor for capturing light and converting the light into an analog image signal;

an analog-to-digital converter for converting the analog image signal to a digital image; and a digital image processor for compressing the digital image to generate a plurality of data blocks, each block having a plurality of transform coefficients, determining whether to embed a watermark bit in each block based on one of the plurality of transform coefficients in that block and a number of watermark bits remaining to be embedded in the digital image, computing a watermark, having a plurality of bits, for the entire digital image, and embedding a watermark bit in each block for which it was determined to do so by setting the one of the plurality of transform coefficients in that block to match a corresponding bit of the computed watermark.

11. The image capturing device of claim 10, wherein said digital image processor sets to zero at least one bit of the one of the plurality of transform coefficients in each block for which it is determined to embed a watermark bit.

12. The image capturing device of claim 11, wherein said digital image processor encodes the plurality of blocks after the watermark bit embedding is completed to re-compress the watermarked image.

13. The image capturing device of claim 11, wherein said digital image processor updates a hash value at each block by applying a hash function at each block, wherein the hash value computed at a last block is the multiple-bit hash value representative of the entire digital image.

14. The image capturing device of claim 11, wherein said digital image processor obtains a quantizer of the one of the plurality of transform coefficients in each block and multiples the one of the plurality of transform coefficients in each block by its quantizer.

15. A computer system including a processor and a memory having a computer-readable readable program code embodied therein for causing the processor to detect tampering of a compressed watermarked digital image by performing the steps of:
    partially decoding the compressed watermarked image to generate a plurality of data blocks, each block having a plurality of transform coefficients;
    determining each block in which a watermark bit is embedded;
    extracting, from each block for which it was determined in said determining step to be an embedder of a watermark bit, at least one bit of one of the plurality of transform coefficients in that block to generate an extracted watermark;
    computing a hash value of the digital image by applying a hash function at each block based on a zeroed value of the at least one bit of one of the plurality of transform coefficients in that block, wherein the hash value computed at a last block is a multiple-bit value representative of the entire digital image; and
    comparing the extracted watermark with the multiple-bit value by applying a digital signature verification algorithm to determine whether the compressed watermarked image has been tampered with.

16. The computer system of claim 15, wherein the one of the plurality of transform coefficients in each block is the transform coefficient representative of the highest vertical frequency and highest horizontal frequency in that block.

17. A method of watermarking a digital image, having a plurality of pixels, comprising the steps of:
    computing a watermark, having a plurality of bits, for the entire digital image, comprising the steps of:
        determining whether to embed a watermark bit in each pixel based on one of a plurality of bits representative of that pixel and a number of watermark bits remaining to be embedded in the digital image;
        setting to zero at least one bit of each pixel for which it is determined in said determining step to embed a watermark bit;
        updating a hash value at each pixel by applying a hash function at each pixel, wherein the hash value computed at a last pixel is a multiple-bit hash value representative of the entire digital image; and
        applying a secret key and a digital signature algorithm to the multiple-bit hash value to compute the watermark; and
    embedding a watermark bit in each pixel for which it was determined to do so in said determining step by setting the at least one bit of that pixel to match a corresponding bit of the computed watermark.

18. The method of claim 17, wherein the at least one bit is the least significant bit.

19. A method of detecting tampering of a watermarked digital image, having a lo plurality of pixels, comprising the steps of:
    determining each pixel in which a watermark bit is embedded;
    extracting, from each pixel for which it was determined in said determining step to be an embedder of a watermark bit, at least one of a plurality of bits representative of that pixel to generate an extracted watermark;
    computing a hash value of the digital image by applying a hash function at each pixel based on a zeroed value of the at least one bit of that pixel, wherein the hash value computed at a last pixel is a multiple-bit value representative of the entire digital image; and
    applying a digital signature verification algorithm to the extracted watermark and the multiple-bit computed hash value and a public key to determine whether the compressed watermarked image has been tampered with.

20. The method of claim 19, wherein the at least one bit is the least significant bit.

21. A method of watermarking a compressed digital image, comprising the steps of:
    adding a visible watermark;
    computing an invisible watermark from the digital image and the visible watermark, comprising the steps of:
        partially decoding the compressed digital image to generate a plurality of data blocks, each block having a plurality of transform coefficients;
        obtaining a quantizer of the one of the plurality of transform coefficients in each block;
        multiplying the one of the plurality of transform coefficients in each block by its quantizer;
        determining whether to embed an invisible watermark bit in each block based on one of the plurality of transform coefficients in that block that is representative of a highest vertical frequency and a highest horizontal frequency in that block and a number of invisible watermark bits remaining to be embedded in the digital image;
        setting to zero at least one bit of the one of the plurality of transform coefficients in each block for which it is determined in said determining step to embed an invisible watermark bit;
        updating a hash value at each block by applying a hash function at each block, wherein the hash value computed at a last block is a multiple-bit hash value representative of the entire digital image; and
        applying a secret key and a digital signature algorithm to the multiple-bit hash value to compute the invisible watermark; and
    embedding an invisible watermark bit in each block for which it was determined to do so in said determining step by setting the at least one bit of the one of the plurality of transform coefficients in that block to match a corresponding bit of the computed invisible watermark.

* * * * *

UNITED STATES PATENT AND TRADEMARK OFFICE
CERTIFICATE OF CORRECTION

PATENT NO.     : 6,064,764
DATED          : May 16, 2000
INVENTOR(S)    : Vasudev Bhaskaran, et al.

It is certified that errors appear in the above identified patent and that said Letters Patent is hereby corrected as shown below:

Title page, item 56, References Cited, US Patent Documents, change "5,942,414" to --5,946,414--.

Column 12, line 13, delete "lo".

Signed and Sealed this

Twenty-fourth Day of April, 2001

Attest:

NICHOLAS P. GODICI

Attesting Officer

Acting Director of the United States Patent and Trademark Office